United States Patent
Lauke et al.

(10) Patent No.: US 7,211,748 B2
(45) Date of Patent: May 1, 2007

(54) FORCE MEASURING SYSTEM HAVING SEVERAL FORCE-MEASURING CELLS AND A CIRCUIT CALCULATING A TOTAL SIGNAL

(75) Inventors: Juergen Lauke, Rosdorf (DE); Christian Oldendorf, Goettingen (DE); Thomas Schink, Goettingen (DE)

(73) Assignee: Sartorius AG, Goettingen (DE)

( * ) Notice: Subject to any disclaimer, the term of this patent is extended or adjusted under 35 U.S.C. 154(b) by 95 days.

(21) Appl. No.: 10/985,980

(22) Filed: Nov. 12, 2004

(65) Prior Publication Data

US 2005/0121236 A1    Jun. 9, 2005

Related U.S. Application Data

(63) Continuation of application No. PCT/EP03/04385, filed on Apr. 26, 2003.

(30) Foreign Application Priority Data

May 15, 2002    (DE)    ................ 102 21 628

(51) Int. Cl.
*G01G 19/00*    (2006.01)
*G01G 23/01*    (2006.01)
*B60R 21/015*    (2006.01)
(52) U.S. Cl. .............. 177/199; 280/735; 180/273; 701/45; 702/101
(58) Field of Classification Search .......... 180/273; 280/735; 701/45; 177/144, 199, 200, 211, 177/229, 210 R, 50; 702/101
See application file for complete search history.

(56) References Cited

U.S. PATENT DOCUMENTS

| | | | | |
|---|---|---|---|---|
| 4,502,555 A | * | 3/1985 | Gower | 177/25.14 |
| 4,815,547 A | * | 3/1989 | Dillon et al. | 177/25.14 |
| 5,004,058 A | * | 4/1991 | Langford et al. | 177/25.13 |
| 5,623,128 A | * | 4/1997 | Grimm et al. | 177/25.13 |
| 5,750,937 A | * | 5/1998 | Johnson et al. | 177/25.11 |
| 5,841,077 A | * | 11/1998 | Kolaci | 177/210 R |
| 6,070,115 A | * | 5/2000 | Oestreicher et al. | 701/45 |
| 6,242,701 B1 | * | 6/2001 | Breed et al. | 177/144 |
| 6,282,473 B1 | * | 8/2001 | Steffens, Jr. | 701/45 |
| 6,576,849 B2 | * | 6/2003 | Bliss et al. | 177/25.13 |
| 6,919,516 B2 | * | 7/2005 | Frye et al. | 177/25.13 |

(Continued)

FOREIGN PATENT DOCUMENTS

DE    44 17 228 A1    11/1995

(Continued)

*Primary Examiner*—Randy W. Gibson
(74) *Attorney, Agent, or Firm*—Sughrue Mion, PLLC

(57) ABSTRACT

A force measuring system with at least two load cells (1, 2), which detect and convert partial forces of the force to be measured into a digital output signal, and with an electronic circuit (5), which calculates a total signal from the output signals of the individual load cells according to the amount of the force to be measured and transmits this total signal to another electronic unit (3) for further processing or data output. The electronic circuit (5) is integrated into at least one load cell (2), whereby the hardware requirements are minimized while detection of the measured values is clearly separated from further processing of the measured values. Advantageously the electronic circuit (5) can be integrated into each load cell (2).

27 Claims, 4 Drawing Sheets

U.S. PATENT DOCUMENTS

2001/0010424 A1    8/2001   Osmer et al.
2001/0054516 A1   12/2001   Breed et al.
2004/0026135 A1*   2/2004   Huitt et al.
2005/0027418 A1*   2/2005   Murphy

FOREIGN PATENT DOCUMENTS

EP    0 319 176 A2    6/1989
EP    0 319 202 A2    6/1989

* cited by examiner

FORCE MEASURING SYSTEM HAVING SEVERAL FORCE-MEASURING CELLS AND A CIRCUIT CALCULATING A TOTAL SIGNAL

This is a Continuation of International Application PCT/EP03/04385, with an international filing date of Apr. 26, 2003, which was published under PCT Article 21(2) in German, and the disclosure of which is incorporated into this application by reference.

FIELD AND BACKGROUND OF THE INVENTION

The invention relates to a force measuring system with at least two load cells that detect the partial forces of the force to be measured and that convert them into a digital output signal. The force measuring system further has an electronic circuit that uses the output signals of the individual load cells to calculate a total signal that depends on the magnitude of the force to be measured. It transmits this signal to another electronic unit for further processing or data output.

EP 319 202 B1 discloses a weighing scale with multiple load cells in which the electronic circuit, which calculates the total signal and transmits it to the downstream electronic unit, is accommodated in a so-called junction box. The individual load cells are connected with the junction box in a star shape, and the total signal as the output signal of the junction box is supplied to the downstream electronic unit via a separate connecting line.

The use of a separate junction box, however, results in additional hardware complexity.

The circuit that calculates the total signal and transmits it to the electronic unit connected downstream can also be integrated in the downstream electronic unit. In this case, however, program parts and/or circuit elements, which are required to calculate the total signal, are located in the downstream electronic unit. As a result, the clear separation of the functions, "determining the force measurement result" on the one hand and "further customer-specific processing of this measurement result" on the other, is no longer provided. This separation is important, for example, for the ability to verify the individual steps, for questions of the calibratability of the measurement result or for extensive processing algorithms that differ for different customers.

OBJECTS OF THE INVENTION

Thus, an object of the invention is to further develop a force measuring system, such that a clear separation between determining the measurement result and the subsequent processing of this measurement result is achieved with minimum complexity.

SUMMARY OF THE INVENTION

According to the invention, this object is attained by integrating the electronic circuit, which calculates the total signal and transmits it to another or a separate downstream electronic unit, in at least one load cell.

With this integration, the separate junction box is completely eliminated. Since the individual load cells have a microprocessor in any case, which performs the analog to digital conversion, the temperature compensation, etc., the program of this microprocessor needs to be expanded only by the program to form the total signal. This may require a microprocessor with a larger memory in some cases, but often the existing memory is sufficient for the additional program parts, so that integrating this additional function does not involve any additional hardware costs. In this case, in particular, it is advantageous to integrate the electronic circuit for calculating the total signal and transmitting it to the downstream electronic unit in each load cell. As a result, the parts are identical and there is no need to distinguish between different load cell types in design or assembly or in the event that a replacement is required because of a fault.

Other advantageous embodiments are disclosed herein. It should be noted, in particular, that it is also possible to construct a scale from a force measuring system with at least three load cells on which a common weighing platform is supported.

BRIEF DESCRIPTION OF THE DRAWINGS

The invention will now be described with reference to the schematic figures, in which.

DETAILED DESCRIPTION OF THE PREFERRED EMBODIMENTS

In the embodiments described herein, the force measuring system is depicted with three load cells. Force measuring systems in accordance with the invention and having two load cells or with four or more load cells are also contemplated and would be constructed in a similar manner to achieve the desired objectives of the invention.

Figure 1:
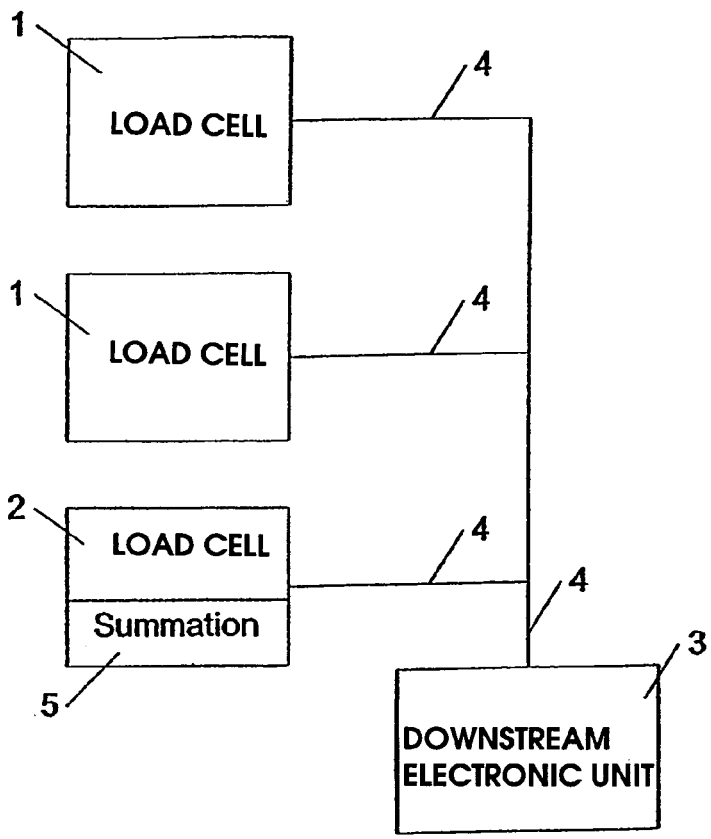
FIG. 1 shows a first embodiment of the force measuring system.

The force measuring system depicted in FIG. 1 consists of two ordinary digital load cells 1 and a load cell 2, in which the electronic circuit 5 for calculating the total signal and transmitting it to the downstream electronic unit 3 is integrated. The three load cells are mechanically integrated in the force measuring system in a known manner, such that each load cell detects a partial force of the force to be measured, and the total force to be measured generally equals the sum of the three partial forces. In a scale, for example, the weighing platform is supported on the three load cells and the distribution of the partial forces over the three load cells depends on the position of the item being weighed on the platform. However, the sum of the three partial forces always equals the total weight of the weighed item. The three load cells are interconnected by a bus system 4. The downstream electronic unit 3 is also connected to this bus system 4. The two load cells 1 transmit their output signal to the bus system 4. From there it is picked up by the electronic circuit 5 in the load cell 2 and combined with the signal of the load cell 2 to form the total signal. The electronic circuit 5 again transmits this total signal to the bus system 4 and thereby to the downstream electronic unit 3. Thus, with respect to the communication among the three load cells, the electronic circuit 5 has the function of a master. It requests the three individual values and processes them to form the total signal. With respect to the communication with the downstream electronic unit 3, however, the circuit 5 is a slave, which, when prompted, transmits its total signal to the downstream electronic unit 3. Thus, the three load cells, together with the circuit 5 integrated in the load cell 2, form an autonomous unit. Together they determine the total signal, which depends on the magnitude of the force to be measured, and output it to the downstream electronic unit 3. The downstream electronic unit 3—depending on the application—only needs to output/display the data or to perform the customer-specific processing.

In the development and testing of the force measuring system, there is consequently a clear separation of responsibilities: The measuring system manufacturer is responsible for the load cells 1 and 2, the electronic circuit 5 and the internal communication between the load cells, and transmittal of the finished total signal representing the quantity of the force to be measured to the downstream electronic unit 3, which falls entirely within the responsibility of the user.

The separation between the actual load cell 2 and the electronic circuit 5, which is indicated in the figure by the dashed line, is of course only a graphical way to represent the different functions. In general, one and the same microprocessor will perform both types of functions: the functions of the actual load cell, e.g., controlling the analog to digital conversion, the temperature compensation, scaling, etc., and the calculation and control functions of the electronic circuit 5, which calculates the total signal and transmits it to the downstream electronic unit 3. Frequently, the microprocessor, which is present in the load cell in any case, will be powerful enough to assume these additional tasks without hardware expansion. In this case, the load cells 1 and 2 do not differ from one another; the load cell 2 merely has a more extensive program stored in it. It is also possible, however, that the microprocessor of the load cell 2 must be a size larger or have a larger memory area or be expanded by an additional memory component.

Figure 2:
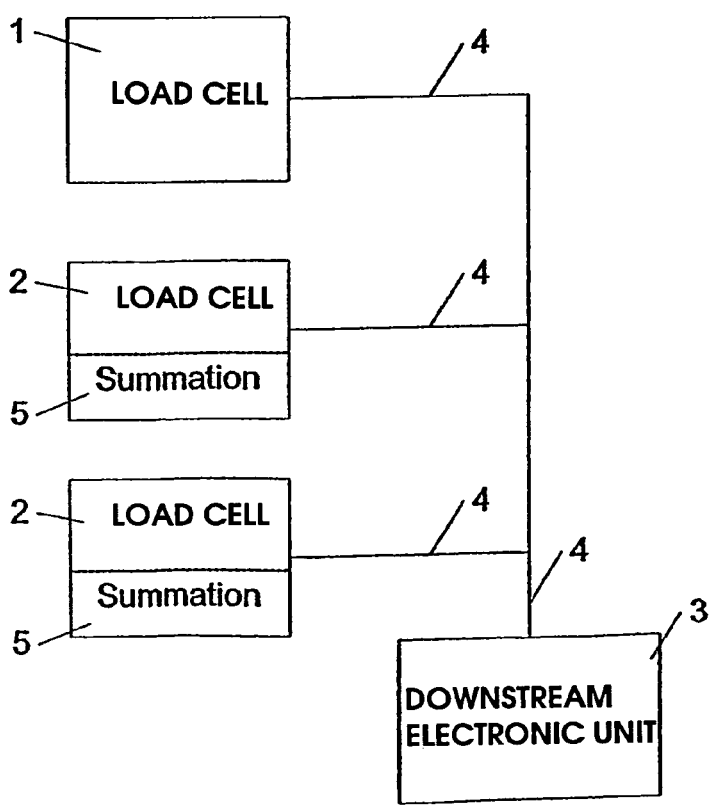
FIG. 2 shows a second embodiment of the force measuring system.

FIG. 2 shows a second embodiment of the force measuring system. Parts analogous or identical to the first embodiment as depicted in FIG. 1 are provided with the same reference numerals and, therefore, no further explanation is required—the same also applies with respect to the subsequent figures. FIG. 2 shows two load cells 2 containing the electronic circuit 5 and only one load cell without the electronic circuit 5. This embodiment has the advantage that the total signal can be calculated by two different electronic circuits 5. For forces that change over time, conventional synchronization mechanisms must be used to ensure that the input data for the calculation by the two electronic circuits 5 are recorded at the identical time. The two results can then be compared, and an error message is output if they do not match. This comparison and the generating of an error message are also performed within the electronic circuit 5. The dual calculation ensures that a functional error can be detected. This is required, in part, for the calibration of the total signal.

Figure 3:
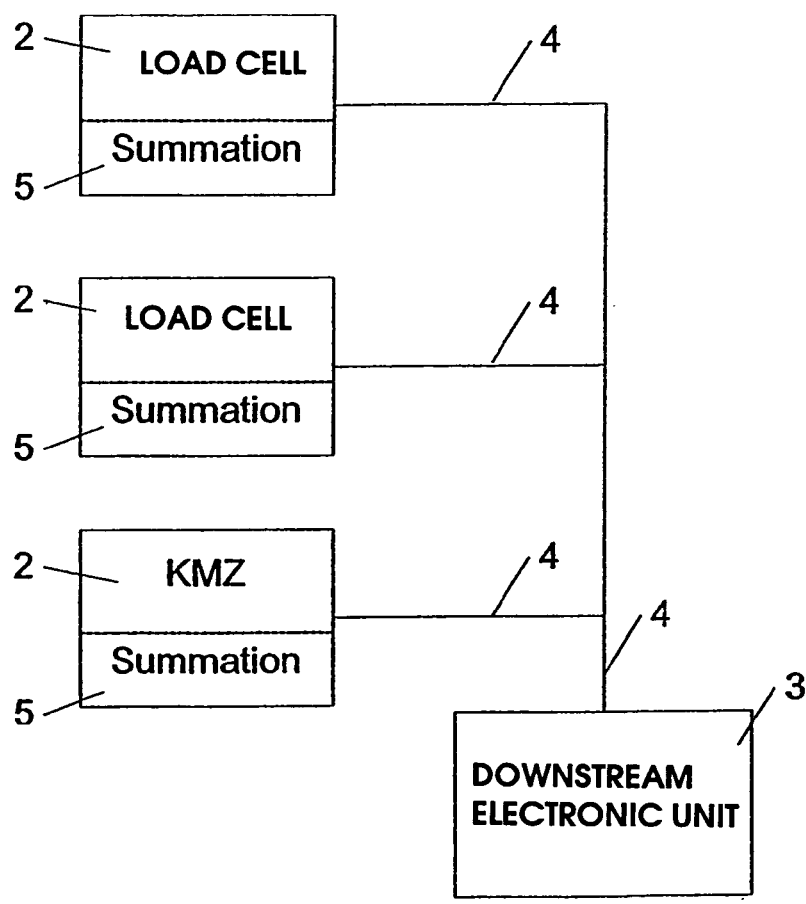
FIG. 3 shows a third embodiment of the force measuring system.

A third embodiment of the force measuring system is shown in FIG. 3. This embodiment has three circuits 5, which calculate the total signal and transmit it to the downstream electronic unit 3. This is advantageous, on the one hand, from the point of view of using identical parts, because only one type of load cells is needed. On the other hand, three electronic circuits 5 also improve the functional error detection. The three calculated total signals can be compared, and if they match, the result is output normally. If two of the total signals match and the third total signal differs, the total signal of the majority and, at the same time, a signal indicating that maintenance/repair is required are output. An error message without a result being output is required only if all three total signals differ.

The embodiment depicted in FIG. 3, however, is also advantageous from the perspective of identical parts alone, particularly if the load cells 1 and 2 are in any case identical in terms of hardware. Using suitable means, e.g., connector coding, selector switch or parameterization in the read-only memory, one electronic circuit 5 can be selected as the active circuit, while the other two electronic circuits 5 remain inactive and are activated only if the first electronic circuit 5 fails.

Figure 4:
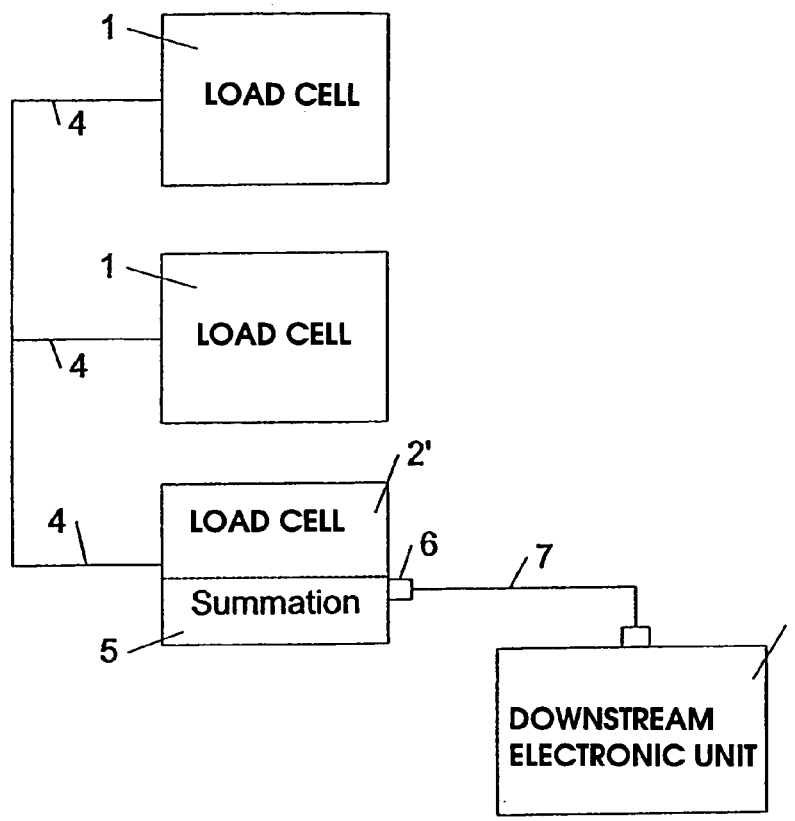
FIG. 4 shows a fourth embodiment of the force measuring system.

FIG. 4 shows a fourth embodiment of the force measuring system. In this embodiment, the downstream electronic unit 3 is not connected to the bus system 4 but by a special connector 6 on the load cell 2', which contains the electronic circuit 5. As a result, the bus system 4 is used only for internal communication among the load cells 1 and 2' and, in terms of hardware, is separate from the connection 7 to the downstream electronic unit 3.

Figure 5:
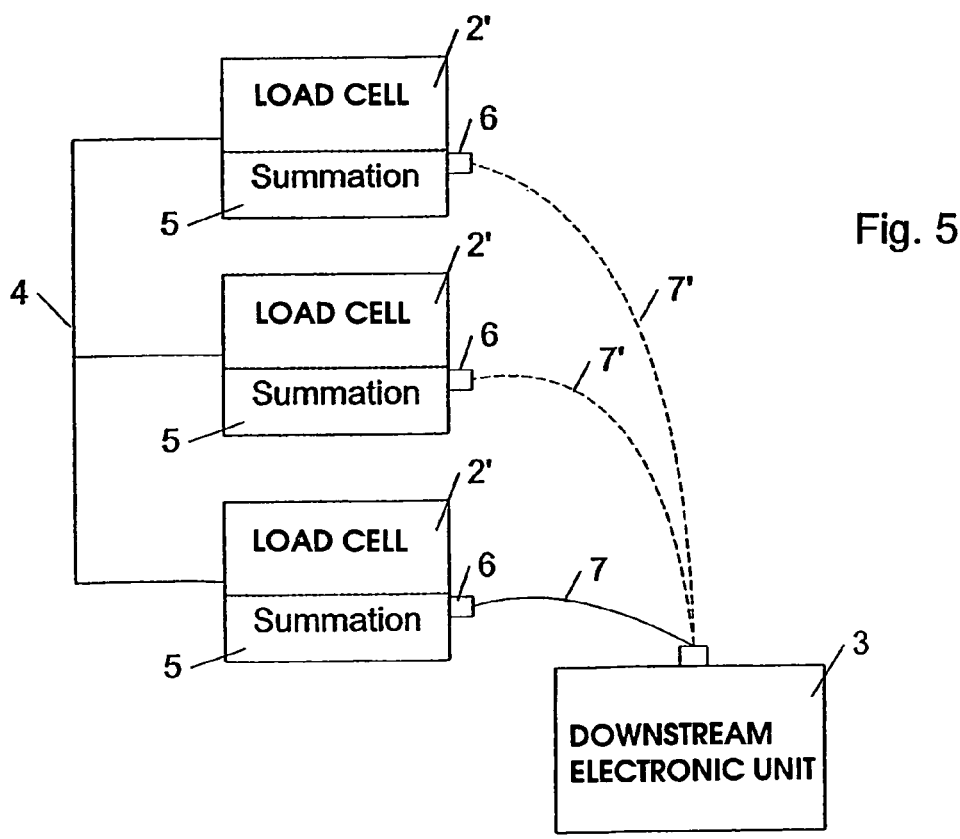
FIG. 5 shows a fifth embodiment of the force measuring system.

The fifth embodiment of the force measuring system depicted in FIG. 5 is similar to the embodiment shown in FIG. 4. It has only three identical load cells 2', each of which includes the circuit 5 and the connector 6. Here, the downstream electronic unit 3 can be connected to any load cell. This is indicated in FIG. 5 by the link 7 and the additional links 7', which are identified by a dashed line. Here, the electronic circuit 5 located in the load cell 2' to which the downstream electronic unit 3 is connected is automatically active, while the other two circuits 5 remain inactive. When the force measuring system is assembled, the geometrically best positioned load cell 2' can be used. For maintenance, the downstream electronic unit 3 can furthermore be connected successively to each of the three load cells to test the proper functioning of the electronic circuit 5. If this functional test is to be continuous, however, the embodiment of FIG. 3 is of course more appropriate.

Figure 6:
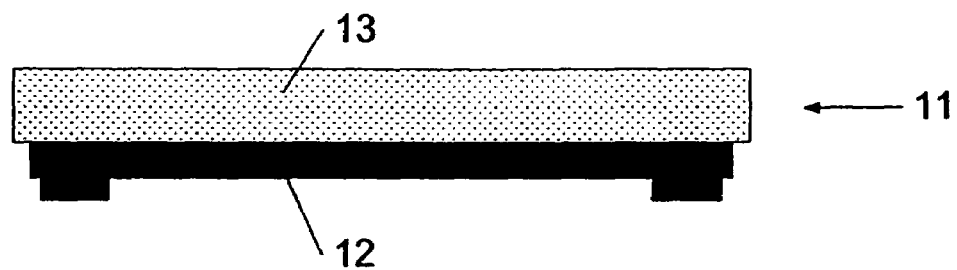
FIG. 6 shows a force measuring system in the form of a scale.

FIG. 6 shows a weighing scale 11, which contains a force measuring system with four load cells. The scale has a substructure 12 with four load cells in its interior, which jointly support the weighing platform 13. Scales of this type are generally known, so that their mechanical construction does not need to be explained in greater detail here. The individual load cells, their interconnection and the electronics are constructed as illustrated in FIG. 1 to 5.

Figure 7:
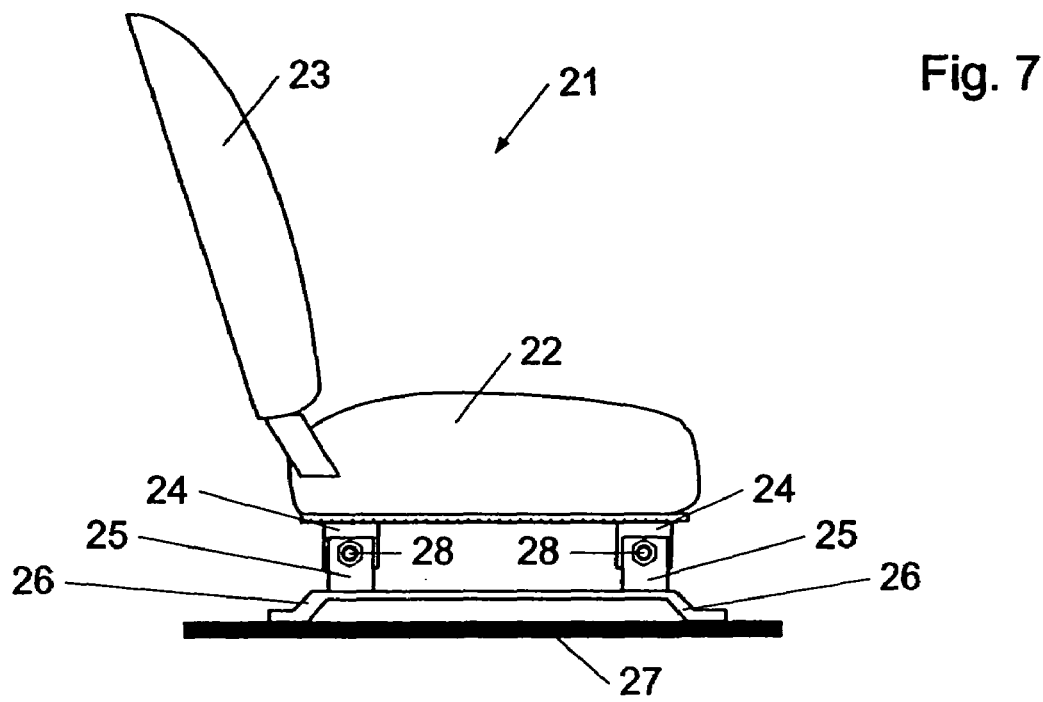
FIG. 7 shows a force measuring system used in a motor vehicle seat.

FIG. 7 shows a seat 21, which is installed, for example, in a motor vehicle. The seat 21 has a seat cushion 22 and a seat back 23. Below the seat cushion 22, four vertical brackets 24 are mounted, two of which are visible in the side view of FIG. 7. Opposite the brackets 24 are brackets 25, which are fixed to a frame 26 on the vehicle floor 27. Between the brackets 25 fixed to the frame and the brackets 24 connected to the seat, a total of four load cells are installed, with the fasting bolts 28, of which two are visible in FIG. 7. The four load cells supply a total signal corresponding to the weight of the seat and the person sitting in it. The four load cells are connected as shown in FIG. 1 to 5. Since the weight of the seat alone is known, the total weight can be used to determine the weight of the person sitting in the seat. This value can be used, for example, to control the different deployment stages of an airbag. In the event of a crash, the airbag is deployed fully if the person is heavy. For lighter persons or a child, the airbag is deployed only partially or switched off altogether.

If, in a force measuring system for a seat in accordance with FIG. 7, not only the summed signal of the four load cells is determined, but also the ratio of the individual signals of the separate load cells to the total/summed signal, the position of the center of gravity of the person sitting in the seat can be derived therefrom. In vehicles with multiple airbags, this center of gravity signal can then be used to control the force with which the individual airbags are deployed or, for example, to prevent the front airbag from being deployed if a strongly forward leaning position is detected.

Likewise, in a weighing scale according to FIG. 6, the individual signals of the separate load cells can be used to derive the position of the center of gravity of the weighed item, such that the scale 11 can be used not only to determine the weight but also the center of gravity.

In special applications, the downstream electronic unit 3 can of course also resort to the output signals of the individual load cells. This presents no problem particularly in the embodiments 1 to 3, since the entire communication takes place over the common bus system 4.

The above description of the preferred embodiments has been given by way of example. From the disclosure given, those skilled in the art will not only understand the present invention and its attendant advantages, but will also find apparent various changes and modifications to the disclosed structures and methods of implementing such structures. It is sought, therefore, to cover all such changes and modifications as fall within the spirit and scope of the invention, as defined by the appended claims, and equivalents thereof.

What is claimed is:

1. A system for measuring a force, comprising:
   at least two load cells, each detecting a partial force of the force to be measured and outputting a corresponding digital output signal,
   an electronic unit;
   an electronic circuit that, based on the output signals of the load cells, calculates a total signal corresponding to a magnitude of the force to be measured and transmits the total signal to the electronic unit for further processing or data output; and
   at least one additional electronic circuit,
   wherein the load cells are interconnected by a bus system, wherein the electronic unit is connected to the bus system, wherein each of the electronic circuits is integrated into a different one of the load cells, and wherein a determination as to which of the electronic circuits calculates the total signal and transmits the total signal to the electronic unit is made by connector coding, selector switch or parameterization in a read-only memory.

2. A system for measuring a force, comprising:
   at least two load cells, each detecting a partial force of the force to be measured and outputting a corresponding digital output signal,
   an electronic unit;
   an electronic circuit that, based on the output signals of the load cells, calculates a total signal corresponding to a magnitude of the force to be measured and transmits the total signal to the electronic unit for further processing or data output; and
   at least one additional electronic circuit,
   wherein the load cells are interconnected by a bus system, wherein the electronic unit is connected to the bus system, wherein each of the electronic circuits is integrated into a different one of the load cells, wherein at least two of the electronic circuits each calculates a respective total signal and transmits the respective total signal to the electronic unit, wherein the transmitted total signals are compared, and wherein an error signal is output if the transmitted total signals do not match.

3. A system for measuring a force, comprising:
   at least two load cells, each detecting a partial force of the force to be measured and outputting a corresponding digital output signal,
   an electronic unit;
   an electronic circuit that, based on the output signals of the load cells, calculates a total signal corresponding to a magnitude of the force to be measured and transmits the total signal to the electronic unit for further processing or data output; and
   at least two additional electronic circuits,
   wherein the load cells are interconnected by a bus system, wherein the electronic unit is connected to the bus system, wherein each of the electronic circuits is integrated into a different one of the load cells, wherein each of the electronic circuits calculates a respective total signal and forwards that the respective total signal to the electronic unit, wherein the three forwarded total signals are compared, and wherein an output is generated by the electronic unit only if at least two of the respective total signals match.

4. The system as claimed in claim 1, wherein at least one of the load cells has an additional connection for the electronic unit.

5. The system as claimed in claim 1, comprising at least three load cells and a common weighing platform, and wherein the common weighing platform is supported by the at least three load cells.

6. The system as claimed in claim 5, wherein the electronic circuit that calculates the total signal and transmits the total signal to the electronic unit calculates additional parameters.

7. The system as claimed in claim 6, wherein the additional parameters include the position of the center of gravity or the point of application of the force to be measured.

8. The system as claimed in claim 1, comprising at least three load cells and a seat, and wherein the at least three load cells determine the load on the seat.

9. The system as claimed in claim 8, wherein the electronic circuit that calculates the total signal and transmits the total signal to the electronic unit calculates additional parameters.

10. The system as claimed in claim 9, wherein the additional parameters include the position of the center of gravity or the point of application of the force to be measured.

11. A system for measuring a force, comprising:
    a first load cell that detects a first part of the force to be measured and outputs a corresponding first load cell signal;
    a second load cell that detects a second part of the force to be measured and outputs a corresponding second load cell signal;
    a first electronic circuit integrated into the first load cell;
    a separate electronic unit downstream of the first and second load cells; and
    a second electronic circuit integrated into the second load cell;
    wherein, based on the first load cell signal and the second load cell signal, the first electronic circuit calculates a first total signal corresponding to a magnitude of the force to be measured and transmits the first total signal to the electronic unit for further processing or data output; and wherein a determination that the first electronic circuit calculates the first total signal and transmits the first total signal to the electronic unit is made by connector coding, selector switch or parameterization in a read-only memory of at least one of the first and second load cells.

12. The system as claimed in claim 11, wherein the first and second load cells are interconnected by a bus system.

13. The system as claimed in claim 12, wherein the electronic unit is connected to the bus system.

14. A system for measuring a force, comprising:
a first load cell that detects a first part of the force to be measured and outputs a corresponding first load cell signal;
a second load cell that detects a second part of the force to be measured and outputs a corresponding second load cell signal;
a first electronic circuit integrated into the first load cell;
a separate electronic unit downstream of the first and second load cells; and
a second electronic circuit integrated into the second load cell;
wherein, based on the first load cell signal and the second load cell signal, the first electronic circuit calculates a first total signal corresponding to a magnitude of the force to be measured and transmits the first total signal to the electronic unit for further processing or data output; wherein the second electronic circuit calculates a second total signal corresponding to a magnitude of the force to be measured and transmits that second total signal to the electronic unit; and wherein the transmitted first and second total signals are compared and an error signal is output if the transmitted total signals do not match.

15. A system for measuring a force, comprising:
a first load cell that detects a first part of the force to be measured and outputs a corresponding first load cell signal;
a second load cell that detects a second part of the force to be measured and outputs a corresponding second load cell signal;
a first electronic circuit integrated into the first load cell;
a separate electronic unit downstream of the first and second load cells;
a second electronic circuit integrated into the second load cell,
a third load cell that detects a third part of the force to be measured and outputs a corresponding third load cell signal; and
a third electronic circuit integrated into the third load cell;
wherein, based on the first load cell signal and the second load cell signal, the first electronic circuit calculates a first total signal corresponding to a magnitude of the force to be measured and transmits the first total signal to the electronic unit for further processing or data output;
wherein the second electronic circuit calculates a second total signal corresponding to a magnitude of the force to be measured and transmits that second total signal to the electronic unit;
wherein the third electronic circuit calculates a third total signal corresponding to a magnitude of the force to be measured and transmits that third total signal to the electronic unit; and
wherein the first through third total signals are compared and at least one of the first through third total signals is output only if at least two of the total signals match.

16. The system as claimed in claim 15, wherein the comparison of the first through third total signals is made before any of the first through third total signal are transmitted to the electronic unit.

17. The system as claimed in claim 11, wherein at least one of the first and second load cells has a separate connection to the electronic unit.

18. The system as claimed in claim 11, further comprising a third load cell that detects a third part of the force to be measured and outputs a corresponding third load cell signal, and
a common weighing platform, and
wherein the common weighing platform is supported by the three load cells.

19. The system as claimed in claim 11, further comprising a motor vehicle seat supported at least in part by the first and second load cells, and wherein the force to be measured is a weight of a person seated in the motor vehicle seat.

20. The system as claimed in claim 2, comprising at least three load cells and a common weighing platform, and wherein the common weighing platform is supported by the at least three load cells.

21. The system as claimed in claim 2, comprising at least three load cells and a seat, and wherein the at least three load cells determine the load on the seat.

22. The system as claimed in claim 3, comprising at least three load cells and a common weighing platform, and wherein the common weighing platform is supported by the at least three load cells.

23. The system as claimed in claim 3, comprising at least three load cells and a seat, and wherein the at least three load cells determine the load on the seat.

24. The system as claimed in claim 14, further comprising a third load cell that detects a third part of the force to be measured and outputs a corresponding third load cell signal, and
a common weighing platform, and
wherein the common weighing platform is supported by the three load cells.

25. The system as claimed in claim 14, further comprising a motor vehicle seat supported at least in part by the first and second load cells, and wherein the force to be measured is a weight of a person seated in the motor vehicle seat.

26. The system as claimed in claim 15, further comprising a third load cell that detects a third part of the force to be measured and outputs a corresponding third load cell signal, and
a common weighing platform, and
wherein the common weighing platform is supported by the three load cells.

27. The system as claimed in claim 15, further comprising a motor vehicle seat supported at least in part by the first and second load cells, and wherein the force to be measured is a weight of a person seated in the motor vehicle seat.

* * * * *